Nov. 24, 1959   H. H. MOHAUPT   2,913,959
PENETRATING AND FRACTURING TOOL
Filed Jan. 25, 1954   2 Sheets-Sheet 1
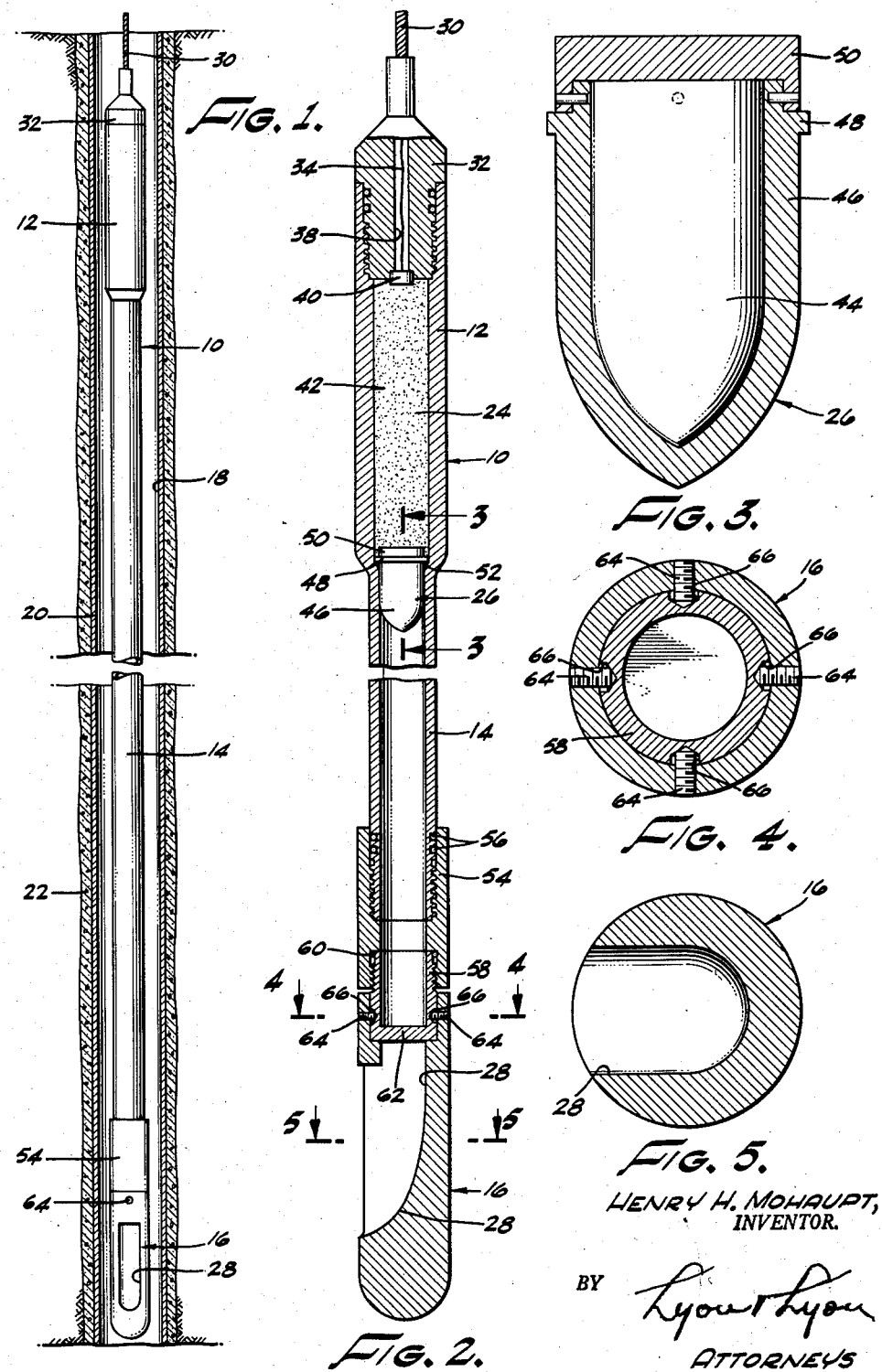
HENRY H. MOHAUPT,
INVENTOR.
BY
ATTORNEYS

United States Patent Office 2,913,959
Patented Nov. 24, 1959

2,913,959
PENETRATING AND FRACTURING TOOL

Henry H. Mohaupt, Fort Worth, Tex.

Application January 25, 1954, Serial No. 405,823

9 Claims. (Cl. 89—1)

This invention relates to a novel method and apparatus for penetrating well casings and penetrating and fracturing formations, and particularly to a method and means for penetrating well casings and penetrating and fracturing formations involving the use of projectiles.

Optimum permissible production rates in oil, gas or water wells are frequently precluded by various conditions encountered in the producing formation into which the well is drilled. For example, the natural tightness of the producing formation or the presence therein of impervious vertical streaks or laminations may well tend to shut off desired flow of the oil, gas and water into the well bore. Similarly, normal drilling and completion processes frequently impair the permeability of the formation, as, for example, when formations ordinarily of good porosity and permeability are contaminated by the drilling mud or cement used, or both.

There are presently several methods employed, all designed to establish flow channels from the oil, gas or water reservoir into the well bore. For example, it has long been the practise to use mechanical means, such as bullets fired from gun perforators or lined shaped explosive charges fired from carriers, the gun perforators and carriers being, of course, lowered into the well to a position adjacent the formation. A principal factor in the practise of these methods is penetration, and for this reason, for example, the petroleum industry has for many years sought methods and means whereby penetration may be increased.

Additionally, a well-known method used to stimulate wells and establish fractures having the same purpose as the aforesaid flow channels is the practise of fracturing the formations by subjecting same to liquids under high pressures. Further, a means for the attempted opening up of the oil, gas or water reservoir in the formation consists in exploding nitroglycerine and the like in the well adjacent the formation, this procedure, of course, being used in open holes as distinguished from cased holes. The latter is ordinarily resorted to only if other methods for adequately producing the well fail inasmuch as it causes considerable devastation of the well, requires expensive cleaning up of the well, and achieves, at best, unpredictable results.

As an adjunct to some of the aforesaid methods, a well is often stimulated by the introduction of fluids through, for example, the perforations in the casing caused by the firing of bullets or shaped charges therethrough or into fissures in the formation caused, for example, by hydraulic fracturing. These fluids for the most part are intended to dissolve certain materials, such as limestone, in the formation, thereby increasing the permeability thereof.

While, for the most part, the aforesaid expedients are of great value in the providing for and the stimulation of production in oil, gas and water wells, the instant invention, which is concerned with the opening up of large deep holes in a formation and the fissuring of same, proposes to increase the production of a given well by more effectively overcoming the aforesaid conditions which preclude optimum permissible production. In this, the apparatus of the invention produces flow channels in the formation effective either in providing communication per se between reservoir and well, or in providing formation conditions adaptable to more effective further conventional treatment, such as hydraulic fracturing or injection of fluids, such as acids, into the formation.

Inasmuch as the deepest penetration obtainable by large lined shaped charges is limited to approximately ten inches in medium-hard oil-bearing formations, and inasmuch as the penetration obtainable by bullets which conventionally are fired from barrels disposed laterally in the well is limited to approximately two or three inches, it may be seen that in many wells no adequate opening of the formation may result. A previous theory has suggested that in order to overcome this disadvantage, more shots should be fired and thus as many as six holes per foot into the formation are made.

The instant invention, however, is based upon the principle that the basic consideration in properly reaching the reservoir for production purposes lies in the extension of the channels and fissures well outwardly of the well bore. Indeed, this invention proposes that but one well-defined large hole extending deeply into the formation beyond the mud sheath or cement or contaminated formation area accomplishes more than, for example, the possible hundreds of short channels currently produced by conventional practice. Consequently, the practise of this invention does not entail the firing of numerous shots from the well bore into the formation, but, on the contrary, contemplates the production of one or, at the most, a few large deeply penetrating holes with consequent fissuring.

Additionally, while the aforesaid is all applicable to formation penetration per se, it is equally applicable as regards further stimulation of the well. For example, when utilizing hydraulic fracturing alone or following conventional shaped charge perforating or bullet perforating, extremely large pressures must frequently be applied in order to achieve formation breakdown, and, indeed, in many cases involving tight formations, formation breakdown is impossible of achievement, the fluid being merely absorbed. Moreover, when subjected to hydaulic pressure generally, a formation will break down at its weakest point. Hence, fluid loss and pressure loss is frequently encountered which accomplishes little or nothing towards stimulation of the well and may actually be damaging thereto. This disadvantage is not avoided by utilizing hydraulic fracturing after the perforating of a large number of holes expanding radially from the well bore. In the instant invention, however, the maximum utilization of hydraulic fracturing is possible inasmuch as, first, a formation penetrated by a large deep hole is amenable to breakdown at relatively low pressures, and, second, because such breakdown takes place at a desired location whereby the reservoir may be reached, and whereby desired fluids are produced as distinguished from undesired fluids, as, for example, water in an oil-producing well.

Again, inasmuch as the instant invention in creating large deep holes in the formation also creates extensive fissuring extending even further into the formation, and places holes and fissures at desired locations in the formation, the injection of fluids, such as acids, is rendered considerably more effective. Moreover, as is apparent from the foregoing discussion, the invention is adaptable towards increasing the effectiveness of secondary recovery procedures, such as water injection of oil wells.

The aforesaid limitations encountered in the use of bullet perforators and lined shaped charges are largely the result of conditions dictated by the necessarily small size of the well bore. Thus, in bullet perforating, a hole of one-half inch diameter is ordinarily produced through the casing with the nose of the bullet lodging approximately two to three inches from the casing, the cement annulus about the casing being usually shattered over a radius of about two inches around the perforation. Inasmuch as the bullet is fired from a gun barrel disposed laterally within the well, it is obvious that the velocity and kinetic energy of the bullet as it strikes the well casing and enters the formation is severely restricted. In the attempt to increase the penetration of bullets, the industry has, of late years, gone so far as to use powder charges creating pressures of 300,000 pounds per square inch, such pressures being in excess of the yielding strengths of the strongest steels. Consequently, the gun perforators used present the danger of bursting within the well and frequently expand to such extent as to be removed from the well only with extensive difficulty. Moreover, due to such expansion, their efficiency decreases markedly after the first use. It has also been proposed that a gun barrel be disposed axially within the well, terminating at its muzzle end with deflecting means, such as an arcuate nose. This provides the advantage of a longer barrel and at the same time permits lateral deflection through the casing. Such apparatus has been proposed only for casing perforating, however, and is neither capable of, nor was intended for, the deep penetration and formation fissuring of the method of the instant invention.

Similarly, the largest conventional lined shaped charges that can ordinarily be accommodated in wells cased with the widely used five and one-half inch casing will produce a hole about one-half inch diameter in the casing, tapering to about one-eighth of an inch in the formation at a maximum depth of about ten inches. While this represents considerable improvement over the bullet type of perforating, and while the fracturing effect of the lined shaped charge upon the cement annulus is at a minimum, it is clear that penetration to this depth and the hole sizes available do not provide the effective channeling and fissuring previously mentioned.

It is, therefore, the principal object of this invention to provide a novel method and means for producing one or a few large deep holes and extensive fissuring within a productible formation adjacent a well bore either for the purpose of providing channels direct from reservoir to well or for the purpose of conditioning the formation for later treatment, such as hydraulic fracturing, acidizing or secondary recovery.

It is a further object of the invention to provide a method for producing wells whereby a channel and/or fissures are located in such portions of the formation as to permit effective subsequent treatment of the well by means of, for example, hydraulic fracturing.

It is a further object of this invention to provide an effective tool wherein a missile is accelerated in a direction essentially parallel to the well bore, wherein the direction of flight of the missile is changed within the narrow confines of the well bore, and wherein the missile is caused to substantially laterally penetrate casing, if present, and formation to produce a large deep hole and extensive fissuring within the formation.

It is a further object of the invention to produce in a tool of the aforesaid nature a direction channel adapted to change the direction of missile flight without otherwise damaging the well or interfering with subsequent operations within the well.

It is a further object of this invention to provide means incorporating such a direction channel, which means while effectively changing the direction of the missile does not otherwise interfere with the well subsequent to the operation of the method of this invention.

And it is yet another object of this invention to provide a correlation between the missile and the direction channel means, whereby optimum penetrations, hole size, and fissuring may be secured.

In the drawings:

Figure 1 shows a view of a cased well bore in which has been lowered the apparatus of this invention, said apparatus being shown in side elevation.

Figure 2 shows a longitudinal sectional view of the invention.

Figure 3 shows a longitudinal sectional view of the missile employed, taken on the line 3—3 of Figure 2.

Figure 4 shows a cross-sectional view of the apparatus of this invention, taken on the line 4—4 of Figure 2.

Figure 5 shows such a cross-section taken on the line 5—5 of Figure 2.

Figure 6:
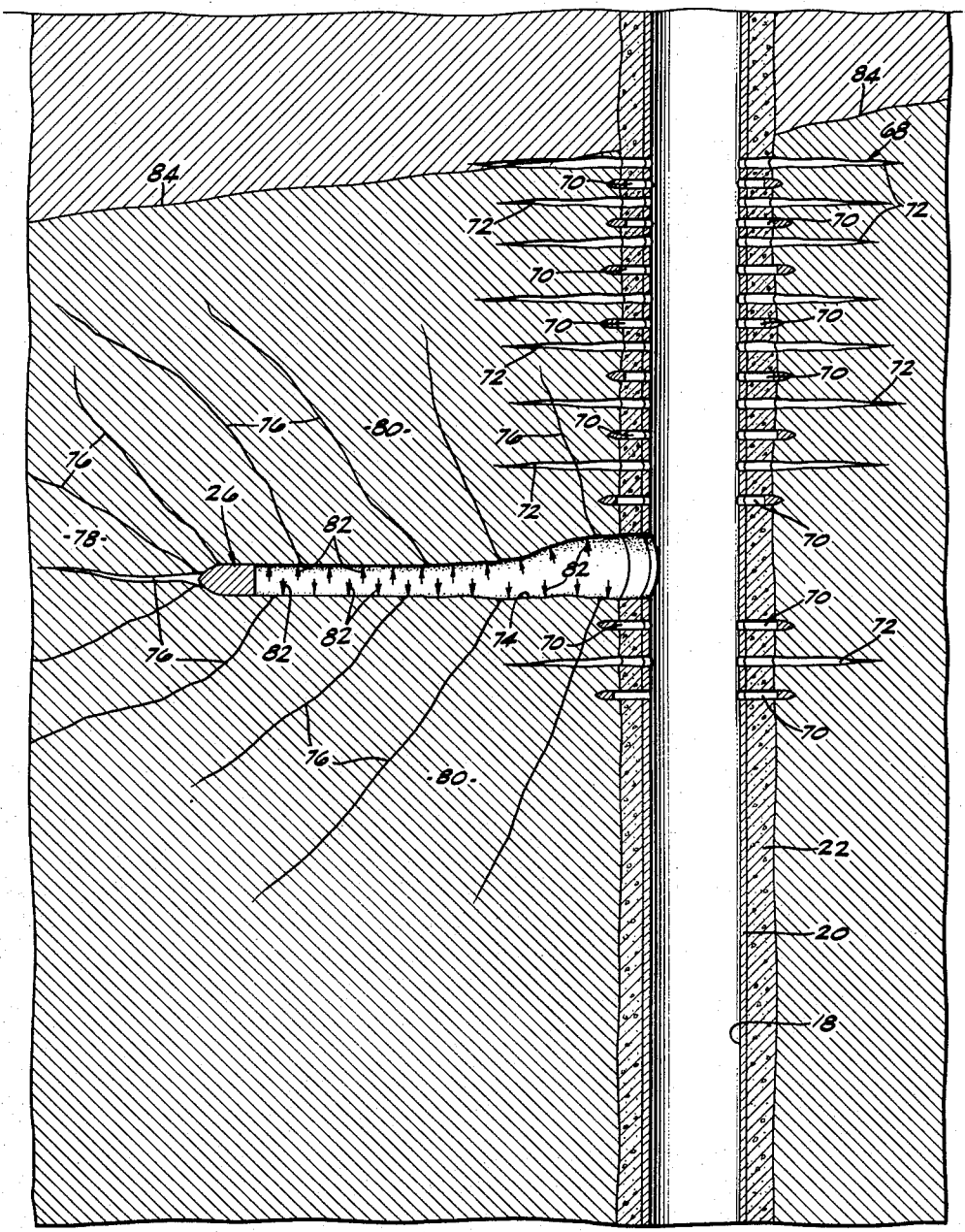
Figure 6 shows the effect of the practise of the instant invention upon a potential producing formation.

In essence, the method of this invention comprises the production, at a desired location, of one or more deep channels and fissures extending several feet or even further radially from a well bore which might be cased or uncased into a potential producing formation by the firing into said formation of a missile possessed of extremely high kinetic energy followed by either production of the well or subsequent hydraulic fracturing, acidizing or other well stimulation utilizing the aforesaid channels and fissures.

The means used for the aforesaid method comprise generally a tool designated 10 in the drawings, which tool consists of a breech 12, a barrel 14, and a directing shoe 16. The tool 10 is lowered into a well bore 18, which well bore is provided with the casing 20 and a cement annulus 22, the powder 24 within the breech 12 being ignited to drive the missile 26 downwardly through the barrel 14 from which it enters the directing shoe 16 provided with a direction channel 28 wherein the direction of the missile is changed to pass through casing and cement into the formation in a substantially lateral direction.

Referring more specifically to Figures 1 through 5 inclusive of the drawings, the tool 10 is suspended from a cable 30 which is secured to the cable head 32 in common manner and through which passes a conductor cable 34. The cable head 32 is threaded into the breech 12 and sealed with respect thereto by the O-rings 36, a bore 38 being provided in said cable head, said cable head being counterbored whereby to receive the conductor 34 and an electric igniter 40. Within the breech is provided a charge 42, and forward of such charge is provided the missile 26, in the instant embodiment the missile 26 comprising a hardened steel core 44 and an aluminum jacket 46 provided with a shoulder flange 48. Pinned to the jacket 46 of the missile is a mild steel base 50.

As shown in Figure 2, the missile seats within the barrel 14 by virtue of abutment between the flange 48 and the narrowed shoulder 52 provided by the diminished inside diameter of the barrel bore.

A muzzle adaptor 54 is threaded onto what would normally be the muzzle end of the barrel 14, and O-rings 56 provide a seal between adaptor and barrel. In turn, a sealing cap 58 is threaded into the adaptor 54 and sealed with respect thereto by the O-ring 60, said sealing cap 58 having a closed end 62 to prevent fluid ingress into the tool. It will be noted that in the embodiment shown, the direction channel 28 is exposed to well fluid. It has been discovered that such well fluid functions to assist in the changing of the direction of the missile 26 from the vertical to the lateral. Four mounting screws 64 cooperating with four recesses 66 in the sealing cap suspend the directing shoe 16 and, as stated before, an arcuate direction channel 28 is defined within the directing shoe 16 whereby upon firing the direction of flight of the missile is altered to the substantial lateral.

In the assembly of the tool, the missile 26 is inserted into the breech 12 and comes to rest against the shoulder 52. The charge 42 is then placed within the breech and the cable head 32 carried by the cable 30 already provided with the electric igniter 40 threaded into the breech.

The muzzle adaptor 54 is then threaded onto the barrel 14 and the sealing cap 58 threaded into said adaptor. Thereafter, the directing shoe 16 is placed over the cap 58 and suspended by means of the mounting screws 64.

In the practise of the method of this invention, the aforesaid tool 10 is lowered into the well adjacent the potential or already producing formation in the aforesaid assembled condition, the directing shoe 16 being positioned opposite the portion of the formation in which it is desired to produce a flow channel and fissures. The electric igniter is actuated. The charge 24 burns, imparting kinetic energy of high order to the missile 26 which passes through the barrel 14, has its direction changed by the direction channel 28 of the directing shoe 16, passes through the casing 20, through the cement 22, through any contaminated portion of the formation and on into the formation, producing a large deep hole in the formation and extensive fissuring caused by the wedging action of the missile and extending from the hole. Thereafter, the channel and fissures formed in the formation are directly utilized for production of the well or for hydraulic fracturing, acidizing or the like.

In the described embodiment of the tool of the instant invention, the directing shoe 16 upon being met by the missile 26 detaches from the sealing cap 62 and is broken into fragments. The remainder of the tool, however, is returned to the surface. If desired, the shooting operations may be repeated to produce an additional channel or channels and fissures in the formation prior to production of the well or subsequent well stimulation.

From the foregoing it will be understood that this invention contemplates the firing of a missile into a formation to produce a large deep hole and fissuring adjacent thereto as distinguished from the former practise of providing a closely spaced pattern of relatively small holes of relatively slight penetration, and that in the practise of the invention the well may be produced directly through the aforesaid channel and fissures or said channel and fissures may be utilized for subsequent hydraulic fracturing or other well stimulation. Additionally, the shooting may be done in one or more well bores spaced from the producer, and secondary recovery water injection utilized to raise formation pressure adjacent said producer. In producing the aforesaid channels and fissures, the invention contemplates that upon the firing of the missile, extreme kinetic energies will be imparted thereto in order that said missile may sufficiently penetrate and fissure the formation.

For example, in oil wells cased with standard five and one-half inch casing, conventional bullet perforating practises are able at a maximum to achieve a kinetic energy of 1,500 ft. pounds per bullet, the velocity of the bullet being about from 1,000 to 1,500 ft. per second and the weight of the bullet being about 350 grains. To impart the aforesaid kinetic energy to a bullet requires pressures of as much or more than 100,000 pounds per square inch within the tool, obviously undesirable.

Similarly, standard lined shaped charge practise in the aforesaid casing achieves as much as 5,000 ft. pounds of kinetic energy per jet, the jet velocity being as much as 25,000 ft. per second and its mass being minute. On the other hand, in the instant invention operating within the aforesaid five and one-half inch casing wherein pressures within the tool do not substantially exceed 50,000 pounds per square inch, kinetic energies on the order of hundreds of thousands of foot pounds may be and are imparted to missiles weighing from one pound to four pounds at muzzle velocities ranging from 2,000 to 4,500 ft. per second, and it is contemplated that these parameters may be considerably increased in the practise of the invention.

Referring, therefore, to Figure 6 of the drawings, it will be seen that, whereas a perforation pattern 68 may be created by holes 70 provided by gun perforating or holes 72 provided by lined shaped charge perforating, the channel 74 and fissures 76 produced by the instant invention extend considerably outwardly of the bore hole and toward the reservoir 78. Tests indicating that as distinguished from the penetrations of less than one foot achieved by the conventional practises, the channel 74 extends several feet into the formation 80 and the fissures 76 extend greatly outwardly of the said channel. Therefore, the instant invention frequently enables the well to be produced directly through said fissures 76 and channel 74.

Additionally, as previously stated, the hole size of the channel 74, which may be as large as three inches through the casing and into the formation, is considerably larger than the one-half inch diameter holes achieved by conventional practises. Not only does this aid in direct production, if available, but such hole size provides a greater surface upon which the fluids under pressure introduced during hydraulic fracturing may act, as indicated by the arrows 82 shown on the drawing. Moreover, whereas in conventional hydraulic fracturing, or, indeed, acidizing, or fluid injection for secondary recovery, fluid and hence pressure may be lost in utilizing the hole pattern 68 by virtue of, for example, undesired formation breakdown at an interface or fault 84, whereas the channel 74 and the fissures 76 locate the pressure application and fracturing and hence localize at a desirable point in the formation.

Obviously, any attempt to impart to missiles the kinetic energy necessary to a practise of the above method creates considerable and difficult problems in respect to the nature of the tool used. For example, within permissible limits of interior pressures ordinary gun perforators having laterally disposed gun barrels could not conceivably perform the required operation. Again, provision of a tool having a gun barrel axially of the well bore presents the problem of how to direct the missile laterally into the formation and how to contain the tremendous energy imparted to the missile without damage to the tool, well, or both. The instant invention, however, insofar as it in part resides in the tool used provides means whereby the aforesaid missile direction is achieved and tool and well damage avoided.

Thus, in the embodiment shown in the drawings, it will be noted that the directing shoe 16 is but suspended from the tool itself by means of the mounting screws 64. Utilizing such mounting, it is apparent that as the missile 26 reaches the direction channel 28, the said shoe releases from the tool. The bulging and distortion and likely sticking in the casing of the tool that would be occasioned were the shoe permanently affixed to the tool is thereby avoided, but the movement of the shoe away from the tool would appear to diminish the direction changing effect of the direction channel 28. In this form of the invention, however, such difficulty is obviated by providing a sufficient mass ratio between the directing shoe 16 and the missile 26 as to permit sufficient turning of the said missile.

Thus, it has been found that in operations utilizing the tool constituting the embodiment of the invention shown in the drawings wherein the ratio of effective shoe mass, i.e., the mass of the shoe below the commencement of curvature of direction channel 28, against missile mass is less than 4, muzzle velocity of the missile is approximately 3,500 ft. per second and the shoe is of cast iron, no substantial direction change of the missile occurs, but that at higher ratios the inertia of the shoe is sufficient to impart significant direction change to the missile, and, as the aforesaid ratio increases to approximately the range of 8 to 12, deflection on the order of 90° is achieved. Further increase in ratio at the aforesaid velocity appears to have no beneficial effect.

Inasmuch as the directing shoe 16 in the aforesaid embodiment is composed of cast iron, such shoe upon operation of the tool is frangible and not only releases from the tool but is broken into numerous pieces, easily drillable in the fell bore, if such be required. Further, it will be understood that the direction channel 28 is open to the well bore, the tool being sealed above said direction channel by means of the sealing cap 58, and it has been found that within the range of velocities set forth hereinabove, such as from 2,000 to 4,500 ft. per second, instead of interfering with the efficiency of the missile 26 in its progress from tool to formation the well fluid assists materially in achieving the direction change of the missile.

Finally, in respect to accommodating a tool to the energy levels involved in the operation of the instant process, it has been found that achievement of the required direction change from axially of the well bore to laterally into the formation is materially assisted in the aforesaid embodiment by providing a certain relationship between the missile 26 and the direction channel 28. Indeed, this relationship is required in the case of a tool 10 wherein the shoe is not releasable from the tool itself, such as might be used in large well bores.

This relationship occurs as a result of the discovery that a plastic flow is desirable between missile and direction channel during the progress of said missile through said channel, such as requires that either the missile or the channel, or both, yield. Absent the aforesaid plastic flow and yielding, a desired key-holing effect whereby the influence of the direction channel upon the missile in changing its direction is lost and 2-point contact of the missile in relation to the channel produced, resulting in disruptive stresses upon said missile which tend towards a breakup of the missile.

In the particular embodiment discussed above, the aforesaid plastic flow is accomplished by use of a cast iron direction channel 28 and a missile 26 having a relatively hard steel core 44 and a relatively soft aluminum jacket 46, whereby in its progress through the direction channel the aluminum jacket 46 of the missile tends to flatten against the harder cast iron but at the same time is embedded, to a certain extent, therein. Conversely, the desirable plastic interface may be achieved by composing the outer portion of the missile of harder material than the cast iron of the direction channel, whereby the embedding would be emphasized and the flattening diminished and, of course, both missile and direction channel may be composed of the same material, such as cast iron.

It is understood to be within the scope of this invention, therefore, that a plastic interface may be provided between missile and direction channel whether missile, direction channel, or both, are composed of material relatively soft at the energies and velocities involved, and it is further to be understood that the direction channel 28 may, for the aforesaid purpose, be lined with a material different from and softer or harder than the body of the directing shoe 16.

That the use of the process of this invention effects extraordinary results may be apparent from certain results achieved within the oil industry by the operation of the process.

In the subsequent examples of said operation, the steel tool used was twenty-seven feet long and had a maximum diameter of four inches. Its barrel bore diameter was two and one-eighth inches. The outer diameter of the missile aluminum jacket was two and one-eighth inches and the diameter of its hard steel core was one and one-half inches. The total weight of the missile was 2.4 pounds and the smokeless powder charge was 2.04 pounds.

The missile velocity was 3,600 ft. per second, and the kinetic energy imparted to the missile amounted to 480,000 foot pounds. The effective weight of the cast iron directing shoe was 22 pounds, and from this it will be noted that the ratio of shoe mass to missile mass was slightly in excess of nine.

*Well of T. & P. Coal and Oil Company, Lea County, New Mexico*

This commercial well is a gas well through a formation extending in elevation from 3,150 ft. to 3,285 ft. It was originally completed by means of lined shaped charge perforations in a pattern constituting 480 holes, and thereafter was originally acidized and subjected to hydraulic fracturing. It produced 135,000 cubic feet of gas per day. The well was then subjected to the process of the instant invention, 8 holes in all being produced by the tool of said invention and was immediately tested and found to produce 238,000 cubic feet per day. Approximately one month later the well continued to consistently produce 198,000 cubic feet per day.

*Well of Stanolind Oil & Gas Company in the Andector-McKee Field in Texas*

This well when originally completed was producing 160 barrels of oil per day at a flowing pressure of 325 pounds per square inch, having been originally perforated by lined shaped charges in the Simpson Sand, a formation zone, from 8,140 ft. to 8,175 ft. Four holes per foot had been shot in the aforesaid zone. Prior to the subjection of the well to the instant process, production of the well was down to 45 barrels per day on gas lift and the owner had attempted to hydraulically fracture the well but was unable to break the formation down using 6,000 pounds per square inch of pressure, although the fracturing fluid flowed into the formation at the rate of two barrels per minute. The well was treated with the process of the instant invention, eight holes being produced and hydraulic fracturing following the shooting. The formation broke down at 3,800 pounds per square inch and the pressure of the hydraulic fluid dropped to 1,800 pounds per square inch, the formation accepting the fracturing fluid at 4 barrels per minute. Thereafter, the well produced, flowing at the rate of 247 barrels per day at a pressure of 675 pounds per square inch.

*Well of Rowan Oil Co., TXL 1–39, Sec. 39, Spraybury Field, Texas*

This well is in the well-known Spraybury Field, which gave great promise of considerable production but the wells in which tended in an extremely short time to decrease production. The particular well was an uncased well, and on July 19, 1952 was subjected to hydraulic fracturing with 4,500 gallons of fluid. The formation fractured at 2,950 pounds per square inch pressure which dropped, after fracturing, to 2,600 pounds per square inch, the formation accepting fluid at 4 barrels per minute. Prior to subjection to the instant invention the well had produced 11,163 barrels by November 3, 1953 and was at that time producing at the rate of 13 to 16 barrels per day. On November 20, 1953 the process of the instant invention was used on the well, shots being placed in the formation at 7,722 feet, 7,713 feet, 7,703 feet, 7,688 feet, and 7,675 feet, and the well being hydraulically fractured. Formation breakdown occurred at 1,300 pounds per square inch, the average injection pressure being 950 pounds per square inch, the formation accepting and the average injection rate averaging 33.3 barrels per minute. Production was resumed on November 23, 1953 and the well flowed at the rate of 235 barrels per day. By December 10, 1953 flow became consistent at the rate of 107 barrels per day.

Well of Gulf Oil Corporation located in Sandhills-Tubbs Field, Texas

This well was originally completed in open hole without casing in the Greyburg Dolomite-Lime Zone from 4,930 feet to 4,880 feet utilizing lined shaped charges. After shooting, attempt was made to acidize the formation and the well production potential was 33 barrels per day. After treatment by the instant process wherein 4 shots were fired in the formation and the well acidized with 2,000 gallons, the production potential for the well was 169 barrels per day.

Well of Evans-Hartwell at Shreveport, Louisiana

This was an old well in the Kilpatrick lime and was producing 8 to 10 barrels of fluid per day, 60% of which was water. The operator had attempted to hydraulically fracture the formation utilizing 5,000 pounds per square inch pressure, but no formation breakdown had occurred. Two shots were made with the tool of the instant invention, locating holes at 3,752 feet and 3,755 feet in the producing zone which extended from 3,750 feet to 3,757 feet. Thereafter the well was fractured with 10,000 gallons of fluid and it was found that the formation broke down in two stages, the first being at a pressure of 3,900 pounds per square inch and the second at 3,000 pounds per square inch, the fluid injection rate being 3 barrels per minute. While production results on this well are not available, it is apparent that formation breakdown was achieved because of the use of the process of the instant invention.

Metcalf A-1 Well of Pearson Siebert Oil Company, Aspermont, Texas

This well was in a 5-ft. producing zone in a conglomerate formation extending from 6,048 feet to 6,053 feet. Prior to treatment with the instant process the well produced 2½ barrels of oil per day. Two rounds were fired with the tool of this invention at 6,050 feet and 6,051 feet and the well was hydraulically fractured with a small amount of fluid. It is now producing 15 barrels of oil per day with 2 to 3 barrels of water, and the production rate is increasing.

I claim:

1. Apparatus for enhancing the productivity of a well, said apparatus being adapted for firing a missile at a high kinetic energy comprising: a barrel; means for lowering said barrel into said well axially of said well; a chamber adjacent the upper extremity of said barrel; a propellent charge within said chamber; a missile within said barrel adjacent said upper extremity; a directing shoe adjacent the lower extremity of said barrel positioned to be struck by said missile to change the direction of said missile to direct said missile into the well formation upon the actuating of said propellent charge; and releasable means mounting said directing shoe on said barrel, said missile actuating said releasable means to release said directing shoe from said barrel in response to passage of said missile from said barrel to said shoe whereby recoil movements of said barrel are not imparted to said shoe while said missile is in engagement therewith.

2. Apparatus as defined in claim 1 wherein a sealing cap is provided between said barrel and said shoe whereby said shoe is exposed to well fluids at all times.

3. Apparatus for enhancing the productivity of a well, said apparatus being adapted for firing a missile at a high kinetic energy comprising: a barrel; means for lowering said barrel into said well axially of said well; a chamber adjacent the upper extremity of said barrel; a propellent charge within said chamber; a missile within said barrel adjacent said upper extremity; a frangible directing shoe adjacent the lower extremity of said barrel positioned to be struck by said missile to change the direction of said missile to direct said missile into the well formation upon the actuating of said propellent charge; said frangible shoe being adapted to be broken into numerous pieces by energy imparted to said shoe by said missile.

4. Apparatus as defined in claim 3 wherein a sealing cap is provided between said barrel and said shoe whereby said shoe is exposed to well fluids at all times.

5. Apparatus for enhancing the productivity of a well, said apparatus being adapted for firing a missile at a high kinetic energy comprising: a barrel; means for lowering said barrel into said well axially of said well; a chamber adjacent against the upper extremity of said barrel; a propellant charge within said chamber; a missile within said barrel adjacent said upper extremity; a directing shoe adjacent the lower extremity of said barrel positioned to be struck by said missile to change the direction of said missile to direct said missile into the well formation upon the actuating of said propellant charge; and frangible fastening means mounting said directing shoe on said barrel, said frangible fastening means being adapted to fail in response to impact of said missile on said directing shoe to thereby release said directing shoe from said barrel.

6. Apparatus as defined in claim 5 wherein said frangible means comprises shear pins holding said shoe to said barrel.

7. Apparatus for enhancing the productivity of a well, said apparatus being adapted for firing a missile at a high kinetic energy comprising: a barrel; means for lowering said barrel into said well axially of said well; a chamber adjacent the upper extremity of said barrel; a propellent charge within said chamber; a missile within said barrel adjacent said upper extremity; a directing shoe adjacent the lower extremity of said barrel positioned to be struck by said missile to change the direction of said missile to direct said missile into the well formation upon the actuating of said propellent charge, the ratio of effective mass of said directing shoe to said missile being in excess of 4:1; and releasable means mounting said directing shoe on said barrel, said missile actuating said releasable means to release said directing shoe from said barrel in response to passage of said missile from said barrel to said shoe whereby recoil of said barrel is not imparted to said shoe while said missile is in engagement therewith.

8. Apparatus for enhancing the productivity of a well, said apparatus being adapted for firing a missile at a high kinetic energy comprising: a barrel; means for lowering said barrel into said well axially of said well; a chamber adjacent the upper extremity of said barrel; a propellent charge within said chamber; a missile within said barrel adjacent said upper extremity; a cast iron directing shoe adjacent the lower extremity of said barrel; a direction channel within said shoe positioned to be struck by said missile to change the direction of said missile to direct said missile into the well formation upon the actuating of said propellent charge, and means mounting said directing shoe on said barrel, said cast iron shoe being adapted to be broken into numerous pieces by energy imparted thereto by said missile.

9. Apparatus for enhancing the productivity of a well, said apparatus being adapted for firing a missile at a high kinetic energy comprising: a barrel; means for lowering said barrel into said well axially of said well; a chamber adjacent the upper extremity of said barrel; a propellent charge within said chamber; a missile within said barrel adjacent said upper extremity, said missile having a steel core and an aluminum jacket; a directing shoe adjacent the lower extremity of said barrel; a direction channel within said shoe, the material of said direction channel being composed of cast iron, the aluminum jacket of said missile being yieldable upon progress of said missile through said channel, whereby to change the direction of said missile to direct said missile into the well formation upon the actuating of said propellent charge, said direction channel being exposed to well fluid; and releasable means mounting said directing shoe on said barrel, said releasable means being adapted to release said directing shoe from said barrel in response to energy of said missile acting on said means through said directing shoe, and said cast iron shoe being adapted to be broken into numerous pieces by energy imparted to said shoe by said missile.

References Cited in the file of this patent

UNITED STATES PATENTS

| | | |
|---|---|---|
| Re. 23,733 | Farris | Nov. 10, 1953 |
| 2,041,209 | Ridley | May 19, 1936 |
| 2,080,875 | Pitzer | May 18, 1937 |
| 2,265,982 | Bolton | Dec. 16, 1941 |
| 2,366,373 | Voorhees | Jan. 2, 1945 |
| 2,494,256 | Muskat et al. | Jan. 10, 1950 |
| 2,630,182 | Klotz | Mar. 3, 1953 |
| 2,708,876 | Nowak | May 24, 1955 |
| 2,754,911 | Spearow | July 17, 1956 |
| 2,766,828 | Rachford | Oct. 16, 1956 |